Dec. 28, 1965  R. C. A. ELAND ETAL  3,226,663
DISC TYPE TURRET TUNER WITH PERIPHERALLY MOUNTED INDUCTORS
Filed June 30, 1961  6 Sheets-Sheet 4

FIG. 11.

INVENTORS
ROBERT C. A. ELAND
WILLIAM G. DELP
C. DALE NESTLERODE
BY OSTROLENK, FABER, GERB & SOFFEN
ATTORNEYS

United States Patent Office 3,226,663
Patented Dec. 28, 1965

3,226,663
DISC TYPE TURRET TUNER WITH PERIPHERALLY MOUNTED INDUCTORS
Robert C. A. Eland, Arcadia, William G. Delp, Pasadena, and Clifford Dale Nestlerode, West Covina, Calif., assignors to Standard Kollsman Industries, Inc., Melrose Park, Ill., a corporation of Illinois
Filed June 30, 1961, Ser. No. 121,151
16 Claims. (Cl. 334—49)

This invention relates to television tuners, and more particularly to novel VHF television tuner constructions resulting in substantially fewer parts, increased reliability, lowered cost, and suitability for automatic production techniques.

Turret type of VHF tuners have a central rotatable assembly or drum of twelve or thirteen removable panels or strips each containing all the RF tuning inductors for one channel. Wafer switch VHF tuners on the other hand have stationary incrementally arrayed inductors, successively connected by central switch arms rotated for the channel tuning. The turret type of construction has basic advantages over tuners using wafer switches and incremental tuning inductors, namely:

(1) The turret switch contacts are exposed on the outer periphery of the turret, where they are easily accessible for cleaning and lubrication.

(2) The turret individual channel strips are removable for ready replacement or servicing.

(3) The entire turret or drum assembly is removable, providing ready access to the chassis components for field servicing.

(4) The turret-type of tuner is more suitable for automatic assembly. The channel strips can be adjusted and pre-tested before final assembly. The chassis can be completely assembled and pre-tested on a separate production line.

(5) Provision for UHF reception in conjunction with a separate UHF tuner is more easily achieved. The "thirteenth" panel is added to the VHF tuner that converts it to an IF amplifier for the UHF.

However, these advantages of the turret tuner are obtained at a higher production cost. The turret switch assembly accounts for most of this increased cost, since the chassis sections are essentially the same for either type of tuner. Combining the turret or drum type of construction with the incremental inductance principle of the wafer switch type, in an effective, practical and novel manner is the basis of the invention tuner.

In accordance with the present invention, the incremental inductances for the RF circuits of the seven high-frequency channels, together with all moving contacts are fabricated as a pair of stamped metal pieces before assembly to a molded plastic switch section. One such section is used for each RF tuned circuit, including the mixer and oscillator portions. Where a double-tuned interstage circuit is used, four switch sections are required; for a single-tuned interstage, three are used.

With the use of comparable RF amplifier and oscillator-mixer circuitry, performance specifications are realized with the invention tuner essentially equal to a standard turret-type of tuner. With only some reduction in gain band width product a three-section tuner hereof is otherwise directly comparable to a double-tuned interstage turret tuner.

The basic comparative features and advantages of the invention molded disc switch section tuner are:

(1) Retains many of the advantages of the turret-type construction including accessibility and service-ability.

(2) Makes maximum use of molded plastic parts in the switching an tuning mechanisms insuring uniformity and lower cost.

(3) Keeps the number of screws, rivets, contact pins and mounting brackets to a minimum.

(4) Capable of smaller physical size than turrets.

(5) Provides for "preset fine tuning" of the local oscillator as an integral portion of the tuner.

(6) Provide for UHF reception in conjunction with a separate UHF tuner.

(7) Incorporates make-before-break contacts on the channel switch to minimize arcing and intermittent contact problems.

(8) Makes use of more automatic production processes in fabrication and assembly than other tuner types.

The invention tuner rotor assembly essentially comprises three (or four) identical novel molded plastic discs, on both sides of which are pressed metal rings that form the high-channel inductance increments and switch contacts. These discs are mounted on the main tuning shaft and arranged to be correctly oriented to the detent disc and to each other by means of integral keys and keyways. They are firmly held on the shaft by spring-loaded retaining rings. The thickness of the invention disc provides the correct axial spacing of the contacts for each circuit, while their hub length provides the correct spacing between the sections.

The mechanized fabrication of the metal ends at the molded discs into radial contacts, incremental inductors, and discrete channel tuning sections, is also an important port of the invention. The upper RF channels 7 to 13 are tuned incrementally by sections of the metal ends; the lower channels 2 to 6 with discrete coils. Also the oscillator section is preferably composed of twelve individual channel coils. These tuning coils rotate with their section disc, and are mounted in semi-cylindrical recesses around the periphery. All coils are wound with the same outside diameter, slightly greater than the inside diameter of the recesses. The coils are thus slightly deformed when inserted, and consequently are held firmly in position before solder connections are made. Three internal flutes are molded into the recesses to reduce the area of intimate contact between the coils and the plastic material of the disc. Otherwise, large variations in effective distributed capacity of the coils would impair frequency stability, which is particularly undesirable in the oscillator circuit. The coils are thus held in the disc and are well protected from accidental mechanical damage, yet accessible for adjustment, when necessary, during final alignment or servicing.

Pre-set fine tuning refers to a system whereby the local oscillator for any channel may be fine tuned with a conventional fine-tuning shaft without disturbing the oscillator setting on any other channel. In order to function properly, it requires a high degree of oscillator stability. The range of frequency shift of the oscillator when the channel switch is repeatedly reset to a given channel should be less than 50 kc. Pre-set fine tuning in the invention disc tuner is accomplished by means of twelve cold-headed aluminum screws. The heads are punched to form a small gear at one end. These adjusting screws are mounted in a molded plastic ring which is then pressed on to the front end of the aforesaid oscillator disc, and keyed to it, so that each screw is positioned coaxially with its corresponding oscillator coil. The "holes" for mounting the screws in the plastic ring are specially shaped with thin internal flutes. All twelve screws are pushed in at one time during assembly. The resilience of the plastic material (Delrin) is such that turning of the screw will drive it in or out until the head of the screw hits stops provided for the purpose, after which the threads slip with further rotation. The gear heads of the adjusting screws or slugs are normally disengaged from a control gear which is longer than the total axial travel of the gear head screws.

The total number of parts used in the channel switch assembly of the invention tuner is less than one-third of that required in a comparable turret switch assembly. The greatest difference is in the number of separate moving contacts and tuning inductors required. Also, coil forms for the tuning inductors, and mounting hardware for the stationary contact assembly, are eliminated. There results a lower cost of material and fabrication, with comparable performance, uniformity, and serviceability. Improved reliability and ruggedness in the field are also achieved.

The above advantages, features and objects of the present invention, as well as others, will become apparent from the following description of an exemplary embodiment thereof, illustrated in the drawings, in which:

FIGURES 9 and 9A, in the counterclockwise fine tuning mode; FIGURES 10 and 10A, in the clockwise mode.

Figure 1:
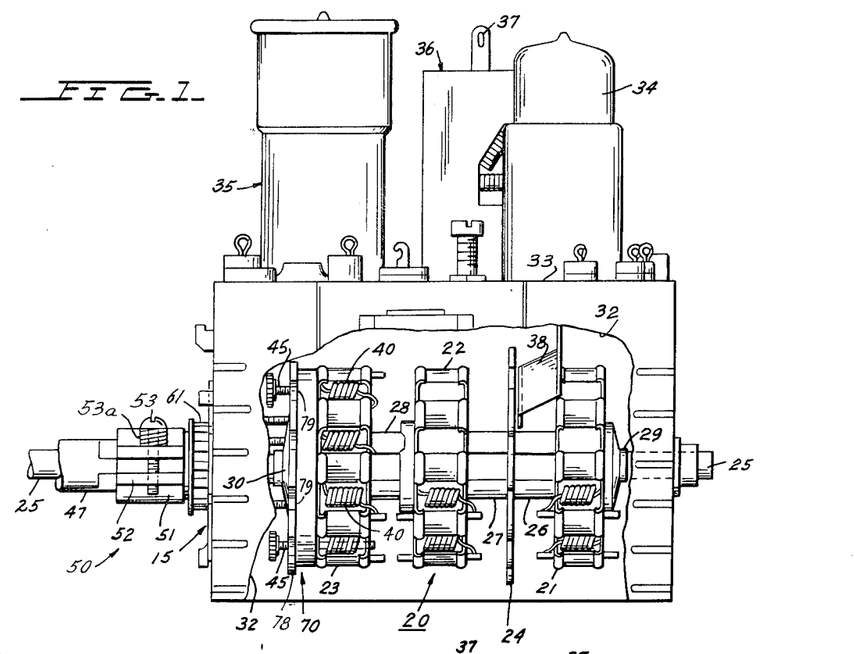
FIG. 1 is a side elevational view, with the rotor drum exposed, of the exemplary VHF tuner.
Figure 2:
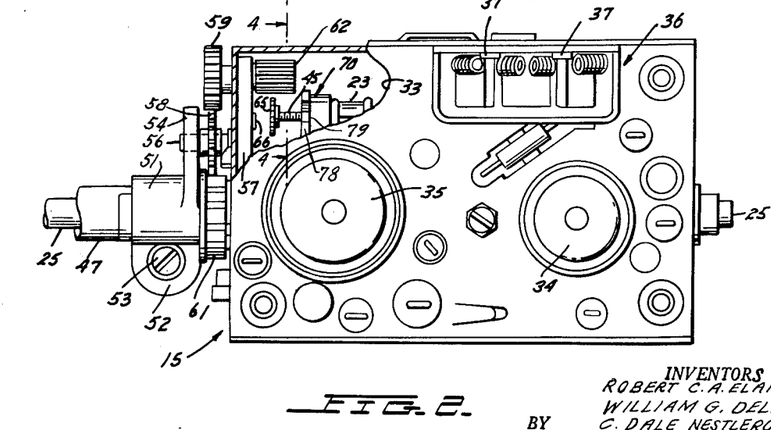
FIG. 2 is a plan view of the tuner of FIG. 1, with one corner cut open to view the preset fine tuning control mechanism.
Figure 3:
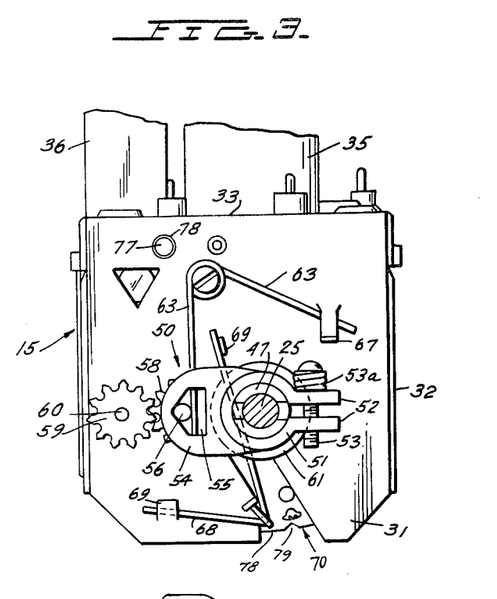
FIG. 3 is an end view of the tuner of FIGURES 1 and 2.

The VHF television tuner, illustrated in FIGURES 1, 2 and 3 is an exemplary embodiment of the present invention. Tuner 15 contains twelve discretely tuned circuits, one for each of the selectable VHF channels. Each tuned circuit includes an adjustable oscillator coil section. The oscillator frequency for the particular channel is adjusted through manual rotation of a threaded metal slug or screw within the oscillator coil, longitudinally locating it for precise tuning.

The rotatable drum 20 of the tuner 15 is composed of the RF or input disc assembly 21, the interstage disc assembly 22, and the oscillator disc assembly 23. The RF disc assembly 21 is electrostatically shielded from disc assemblies 22, 23 by metal detent disc 24. The disc assemblies 21, 22 and 23, together with detent disc 24 are mechanically secured to the control or selector shaft 25, for rotation in unison in a manner to be set forth. Integral spacers 26, 27 and 28 maintain the respective disc assemblies in predetermined spaced axial position. End spring washers 29, 30 hold the rotor assembly 20 intact. The detent disc 24 and disc assemblies 21, 22, 23 mechanically interlock, and contain the individual incremental inductors and coils for the channels.

The VHF tuner 15 is constructed as a box-framed chassis 31, with a removable external shield 32. The stationary circuit components are mounted to the top plate 33, as are the RF amplifier tube 34, and mixer-oscillator tube 35. The antenna input coupling network 36 extends above chassis plate 33 for connection through terminals 37, 37 to an external antenna. A fixed arcuate shield 38 (see FIGURE 1) depends from top plate 33, and separates the upper region between the RF and interstage disc assemblies 21, 22. In this way, the RF stage circuitry is shielded from the interior interstage and oscillator signals, for stability at high gain, and reduced radiation.

The oscillator disc assembly 23 contains an individual coil 40 for each VHF channel to be tuned. Each selector shaft (25) position circuitally connects an oscillator coil (40) and the associated interstage and antenna coils (or inductors) as will be detailed hereinafter with the stationary tuner circuitry. Each oscillator coil 40 is oriented longitudinally in the molded disc 23, with a threaded metal member or slug 45, as of aluminum operable therein. The metal slugs 45, 45 are used to controllably adjust the inductance value of the associated oscillator coil, and its frequency determination for the channel tuning. Such adjustment is presettable individually, in operation through external manual control by the fine tune control mechanism 50, which is the basis of my copending patent application Serial No. 121,148, filed on June 30, 1961, assigned to the assignee hereof, and now abandoned.

The preset fine tuning device 50 is located at the tuning control end of tuner 15. A slip-clutch 51–52 is coupled to the fine tune hollow shaft 47. The slip-clutch is formed by a collar 51 with an extending integral yoke 52 mounted on shaft 47 with a cross-screw 53. The screw 53 has a helical spring 53a to maintain a predetermined tension in the screw setting. The collar is of plastic material, and serves as the slip-clutch on shaft 47. A transverse cam element 54 contains a cam-slot 55 engageable with a pin 56 extending from a resiliently pivoted plate 57. Plate 57 supports idler gear 58 on integral pin 56, and driven gear 59 on shafts 60; see also FIGURES 5 and 6. The slug control pinion 62 is secured on the interior end of shaft 60.

A drive gear 61 is secured with fine tune shaft 47 and operates idler gear 58 in either rotational direction. This in turn drives gear 59 to correspondingly rotate control pinion 62 in either direction. Pinion 62 is selectively engageable with the head gears 65 at the outer end of each threaded slug member 45. The channel selected for tuning-in, through control shaft 25, also locates its slug 45 and associated head gear 65 in engageable relation with preset pinion 62. Pinion 62 is normally held biased away from engagement. When however the fine tune preset shaft 47 is rotated in either direction, slip-clutch 51 is turned to correspondingly displace pin 56 and so holds pin 56 on either end of cam slot 55 during the fine tuning operation.

Figure 9:
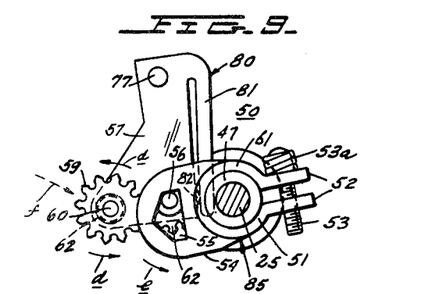
Figure 9A:
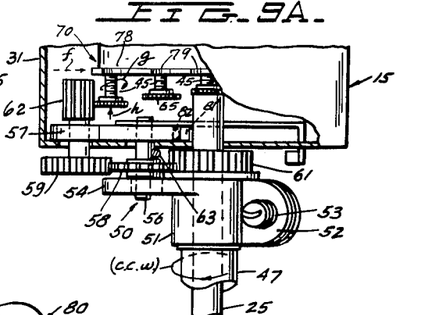
Figure 10:
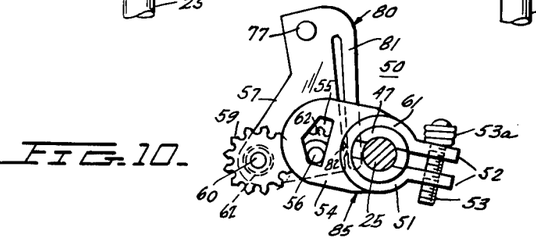
Figure 10A:
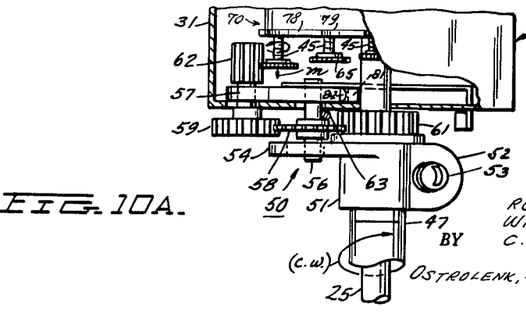

The cam slot 55 is cammed to move the biased spring biased pinion 62 assembly with plate 57 into engagement with the head gear 65 then opposite it; see FIGURES 9a and 10a. Slip-clutch 51 thereupon slips on the fine tune shaft 47, and drive gear 61 turns idler 58, driven gear 59, control pinion 62 and in turn the engaged head gear 65 with its threaded slug member 45. Operation of fine-tune shaft 47 in either direction correspondingly effects directional movement of the threaded slug 45 longitudinally of its associated oscillator coil 40.

In this manner the oscillator setting for any particular channel is adjusted, precisely, through external operation of hollow fine-tune shaft 47. Release of shaft 47 results in pin 56 being positively returned, to the center of cam slot 55, and in biased pinion 62 being directly disengaged from any slug head gear 65. Normal channel selection may thereupon proceed without any oscillator head gear 65 abutting the control pinion 62 or any other portion of preset mechanism 50. The threaded oscillator slugs 45, 45 are firmly retained in a composition ring 70, at their last preset positions. The precise tuning settings are thus maintained, and are individually readily resettable.

Figure 8:
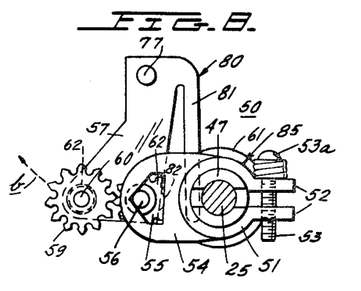
FIGURES 8 and 8A are respective elevational and plan views of the preset mechanism of FIGURE 1, in the neutral position.
Figure 8A:
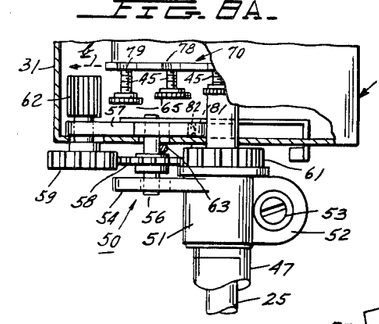

A wire spring with two arms 63, 63 is pivotedly mounted to pin 64 of the chassis wall, with one arm 63 latched to a wall knock-out 67. The free arm of spring wire 63 is pressed against pin 56, as shown in FIGURE 3, to normally bias it radially outwardly, and thereby held engaged with the triangular apex of cam 54 when thus in the neutral mode. This action normally holds plate 57 and control pinion 62 therewith away from the slug head gears 65, as shown in FIGURES 8 and 8a. A second wire spring 68 is held between knock-outs 69, 69 and biases the control shaft 25 in its end chassis mount.

Slug mounting ring 70 retains the threaded slugs 45, 45 against displacement after setting; permits their ready resetting with reasonable torque application; and effects slippage in their thread retention when at either end of their axial positions or stroke. Their outer stroke position is established when the head gear 65 abuts stop 66 at plate 57. Further turning of pinion 62 merely causes slug 45 to slip in the mounting 70.

Figures 4, 5, 6, 7:
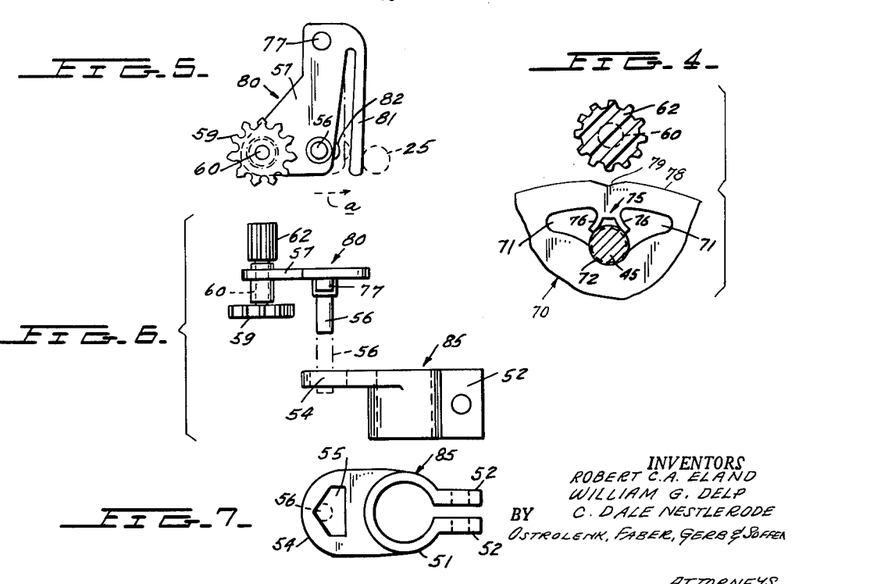
FIG. 4 is an enlarged partial view of the oscillator slug retainer ring, taken along the line 4—4 of FIGURE 2.
FIG. 5 is a side view of the control pinion assembly of the tuner preset mechanism.
FIG. 6 is a separated plan view of the control pinion assembly of FIGURE 5.
FIG. 7 is a face view of the slip-clutch-cam member of the assembly of FIGURE 6.

FIGURE 4 is an enlarged view of a single mount section of the ring 70. At each channel position is located a transverse cavity 71 incorporating a central arcuate portion 72 and an opposed integral retainer channel 75 between which the associated threaded slug 45 is engaged. The channels 75 each contain two tongues or fingers 76, 76 extending at an acute angular relation. The spacing of the channel 75 from portion 72; the angular extent of fingers 76, 76; their relative thickness, hence resilience; the nature of the material used; and the curvature of portion 72 all combine to determine the effectiveness of the grip on a slug 45 held therebetween. Further details on the theory and nature of the slug retainer ring 70 is set forth in copending U.S. patent application Serial No. 112,957 (B-152), filed May 26, 1961 and assigned to the same assignee as the instant invention.

An important advantage of the annular retainer structure 70 is the ready insertion of the threaded slugs 45 into the respective retainer-cavities 71. This is accomplished by simply axially sliding or pressing each slug 45 between the channel 75 and the arcuate portion 72. No internal threading of the tongues 76 or portion 72 is required. The resilient composition material, and the resilient pressure along the fingers 76, 76 on the threaded member 45 accomplishes its retention. Further, and equally important, is the axial displacement such retention permits upon the rotation of the threaded body of the slugs 45, in either direction, in the same manner as though the channel 75 and portion 72 were internally threaded.

The fingers 76, 76 are spread apart from their neutral position to create the retention force or bias along the slugs 45 therein. The slug 45 is pressed against the arcuate portion 72 and thereby firmly gripped in the cavity 71. Thus, the slugs 45 are pressed into their cavity retainers by simple production mechanism. Once in, they are firmly retained, yet are readily displaced axially by rotation. Such displacement in either longitudinal direction is effected through the head gear 65 on the slug's external end, through fine tuner shaft 47 and the mechanism 50, referred to hereinabove.

Further, when the individual slugs 45 are preset in their precise tuning positions through mechanism 50, the retainer 70 construction maintains and firmly grips the slugs 45 despite extremes encountered as vibration, tuner operation, temperature change, and the like. When any slug member 45 reaches either end of its stroke, it simply slips upon further rotation urging it to that end. Upon rotation in the opposite direction, the member is thereupon directly moved axially away from such stroke end. No damage to the retainer 70 occurs, and the slugs 45 return to their normal presetting function. A flange 78 extends integrally from one side of annular retainer 70, containing notches 79, 79 for use with remote control tuner operation circuitry (not shown).

The control pinion assembly 80 is more clearly seen in FIGURES 5 and 6. The mounting plate 57 contains a stub 77 which serves as a pivot for the assembly 80 in operation. Stub 77 is set into aperture 78 in the end chassis wall 31, as seen in FIGURES 2 and 3. A finger 81 extends from the pivotal end of plate 57, and coacts with a stop 82 projecting from plate 57. Proportioning of finger 81 and stop 82, determines the extent of pivotal displacement of the assembly 80. By using sufficiently resilient material for unit 80 the finger 71 may supply sufficient bias to make wire spring 63 unnecessary. Such material may be Derlin or nylon.

Finger 81 is mounted so as to be juxtaposed with selector shaft 25, as seen in FIGURES 8, 9, 10. Displacement of pin 56 of assembly 80 in the control operations, as will be described, swings the control pinion 62 into engagement with a slug head-gear 65; see FIGURES 9a, 10a. Should closer meshing with gears 65 be required in particular tuners in production, shaving down stop 82 readily affords such adjustment. The components of the control pinion assembly 80 are advantageously molded of tough, resilient plastic material. Similarly, the unitary slip-clutch-cam member 85, shown separately in FIGURES 6 and 7, is preferably molded.

FIGURES 8 and 8a illustrate the preset fine tune mechanism 50 in its neutral mode. Station selection is performed by simply rotating shaft 25 to the corresponding angular position. The head-gears 65 of slugs 45 do not touch the outwardly displaced control pinion 62. With fine tune shaft not manipulated, wire spring 63 presses pin 56 radially outwardly. Pin 56 resets in the apex of cam 54, at its outermost radial extent. The plate 57 of control pinion assembly 80 is thereupon pivoted outwardly, on stub 77, in the direction of arrows b, b. The control pinion 62 is thus safely displaced from interfering with the gears 65, 65 during channel selection. The slugs 45, 45 are retained in their previously optimized positions.

FIGURES 9 and 9a illustrate the fine tune control operation for the CCW rotational direction of fine tune shaft 47. Driven gear 59 is thereby also turned CCW, per arrows d, d. Simultaneously, member 85 is turned partially in direction e until pin 56 engages the upper part of its cam 54 in cam slot 55. The upper inclined cam surface thereupon forces pin 56 and the movable portion of assembly 80 radially inwards (towards shaft 25), as indicated by arrows f, f. This results in control pinion 62 engaging with the head-gear 65 for the oscillator coil of the channel positioned in the circuit.

The slug 45 thereof is concurrently rotated in the CW direction, per g, and correspondingly displaced longitudinally in its associated coil. The thread direction of slug 45 determines whether it is moved inwardly or outwardly; but in any event the oscillator frequency is changed at a desired rate for angular turning of shaft 47. The sense of the frequency change is also predetermined in a given construction, in accordance with the CCW or CW turning of shaft 47, as is understood by those skilled in the art. The CW rotation of slug 45 in the exemplary tuner 15 motivates it inwardly of the associated oscillator coil, as indicated by arrow h.

FIGURES 10 and 10a illustrate the action of control mechanism 80 for the CW rotational direction of shaft 47. Assembly 85 is turned CW per i, but stopped by pin 56 at the bottom of cam slot 55. Further rotation of shaft 47 causes clutch 51–52 to slip thereon. The pin 56 draws plate 57 inwards, per arrows j, j, whereupon control pin 62 engages with the positioned head gear 65. Driven gear 59 and pinion 62 are rotated CW through drive gear 61, and in turn drives positioned gear 65 in the CCW direction per l. The slug 45 is thereby displaced in the opposite or outward longitudinal direction, as indicated by arrow *m*, and fine tuning in the opposite sense to that of FIGURE 9a, is performed. Upon release of shaft 47, the control pinion 62 is directly disengaged from the gear 65, and safely displaced automatically to its neutral position, as described in connection with FIGURES 8 and 8a hereinabove.

Figure 11:
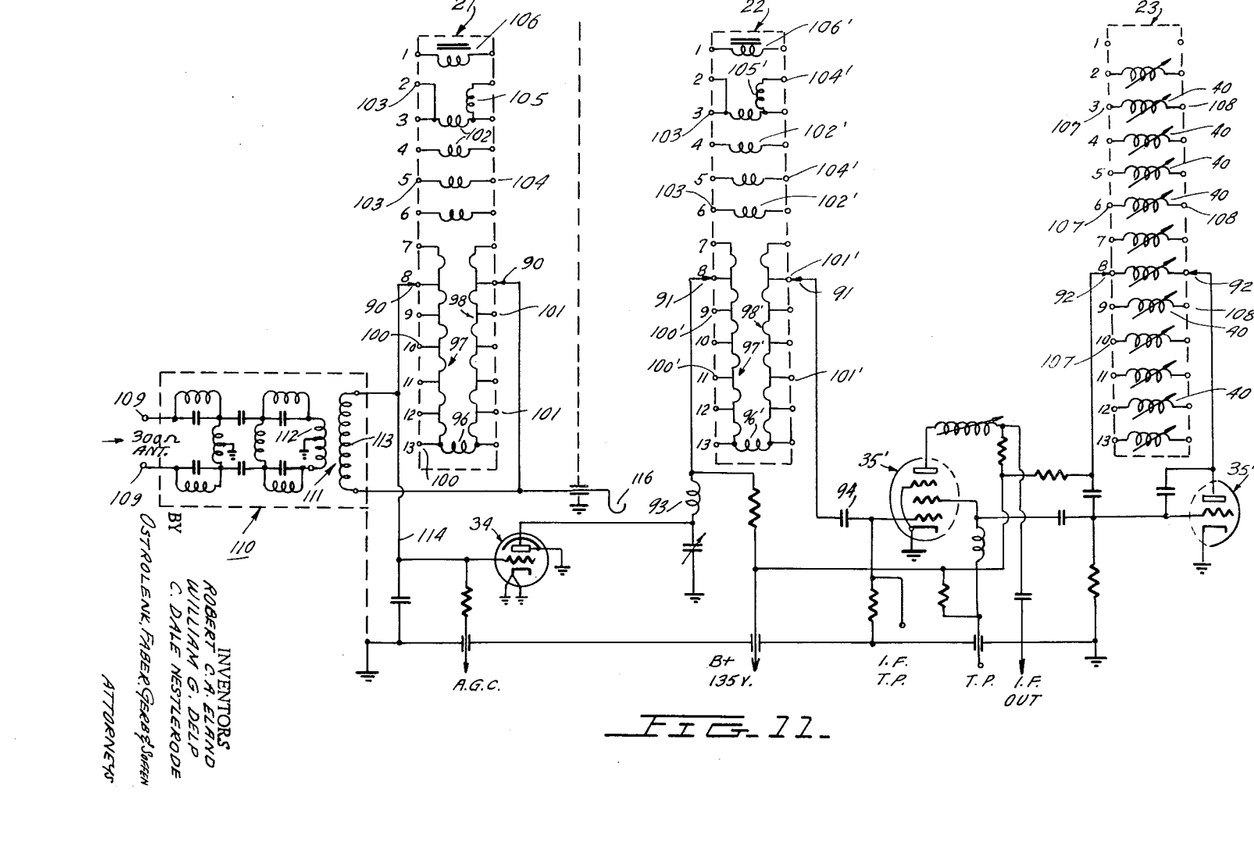
FIG. 11 is a circuit diagram of an exemplary circuit for the tuner.

FIGURE 11 is a typical circuit configuration for the exemplary tuner 15. Other circuits may, of course, be employed with the disc section construction hereof. The illustrative circuit employs the three tunable sections 21, 22, 23 constituting the twelve-channel incremental inductance discs 21, 22, 23 seen in FIGURE 1. The inductance connections for channels 2 through 13 are inserted through the stator contactors or wipers 90, 91, 92.

Contactors 90, 90 connect the RF input disc section 21 across the secondary winding 103 of antenna input transformer 111. Contactors 91, 91 connect the mixer-interstage disc section 22 in series with the interstage tuned circuit between the phase of RF amplifier stage 34 and the control grid input of mixer stage 35', between a fixed series coil 93 and a coupling condenser 94. The oscillator disc section 23 is selectively connected by stator contactors 92, 92 between the plate of oscillator triode tube section 35'' and its control grid through condenser 95.

The discs 21, 22, 23 are rotated in unison and in phase, whereby the proper channel inductance connections are effected to tune-in the desired TV broadcast band of 6 megacycle band width. The tuning inductors for the RF and interstage disc sections 21, 22 are of similar configuration. A single coil 96, 96' is at the channel 13 tuning position. Between channel 13, and successively through to channel 7, two continuous incremental inductor strips 97, 97' and 98, 98' are employed. These strips are preproportioned to provide the tuning for the associated channels to which they connect at their integral radial contacts 100, 100' and 101, 101'.

The lower frequency channels 2 through 6 are derived by individual coils 102, 102' between individual radial contacts 103, 103' and 104, 104'. Lowest channel 2 is provided by a coil 105, 105' in series with the adjacent channel 3 coil 102, 102'. The "channel 1" position is used where conversion to IF amplification is desired when an external UHF tuner is employed. Suitable coils 106, 106' are connected across the channel 1 contacts of discs 21 and 22; its oscillator contacts of disc 23 being unconnected, and therefore out of the circuit for this mode.

The oscillator disc section 23 is preferably composed of individual coils 40, 40 for each channel, across individual radial contacts 107, 108. These oscillator coils are pretuned or preset inductively through the threaded metal slugs 45 as described hereinabove in conjunction with FIGURES 1 through 10a. The exemplary construction of the disc sections 21, 22, 23; their coil and incremental inductor complement, and their radial contacts, are set forth in detail hereinafter.

The 300Ω antenna lead-in connects to the input terminals 109, 109 of a high pass filter network 110, of conventional design, with maximum attenuation in the receiver's IF band. The stationary RF input transformer 111 has its center-tapped primary winding 112 coupled to the secondary winding 113, by a voltage step-up ratio, to the RF tuning section 21, at its contactors 90, 91. Contactor 90 connects to the grid input of the RF amplifier stage 34 through lead 114. The exemplary triode RF amplifier tube 34 contains auxiliary shield plates indicated at 115 that substantially reduce the grid to plate interelectrode capacitance. This facilitates neutralization in the VHF television frequency band, at excellent gain and signal-to-noise ratio, as set forth in U.S. Patent 2,968,742 for "High Efficiency Triode Vacuum Tube," issued on January 17, 1961 and assigned to the assignee hereof. Stable neutralization is maintained through adjustment of a loop 116 positioned close to output lead 117.

The mixer stage 35' and oscillator stage 35'' are conventional for VHF tuners. The B+, IF output, AGC lead, and the IF TP and TP test points and terminals are shown. Each channel is selectively tuned-in by electrically connecting the corresponding coils and/or inductor sections to the common stationary circuit through the contactors 90, 91, 92. The three (or four) inductance disc sections 21, 22, 23 are rotated as a unitary rotary assembly through selector shaft 25. Should any channel require more precise tuning, the preset fine tune shaft 47 is turned in either direction to reset the associated threaded metal slug 45 in the channels oscillator coil 40, as hereinabove set forth.

Figures 12, 13:
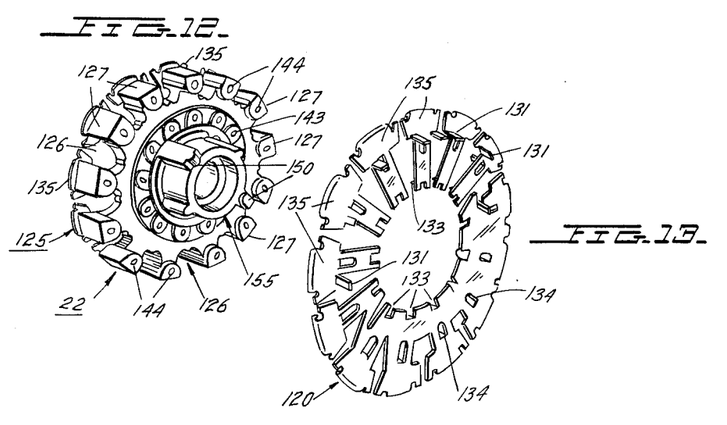
FIG. 12 is a perspective view of a disc assembly of the tuner of FIG. 1, with one contact section removed.
FIG. 13 is an enlarged view, in perspective of the contact-inductor section of FIG. 12, in "exploded" relation thereto.
Figure 14:
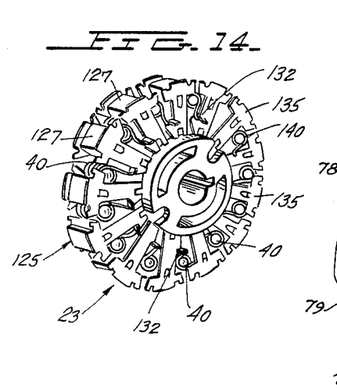
FIG. 14 is a perspective view of an assembled oscillator disc for the FIG. 1 tuner.
Figure 15:
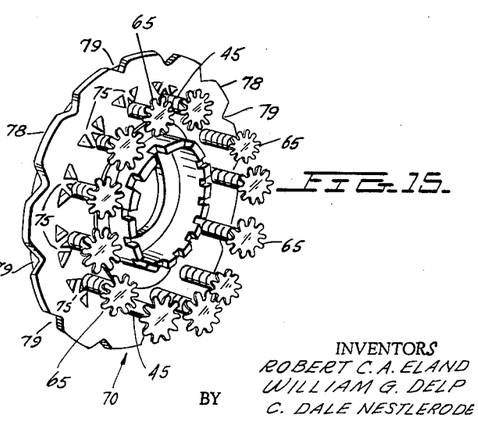
FIG. 15 is an enlarged perspective view of the preset ring for the oscillator disc of FIG. 14.

FIGURE 12 is a perspective illustration of an exemplary RF molded disc section 22 with one of the inductor contact "plates" removed; corresponding to input and interstage discs 21 and 22. Its associated stamped "plate" 120 is diagrammatically arranged in enlarged "exploded" view relation, as FIGURE 13. The oscillator disc section 23 is shown in perspective view FIGURE 14; and an exemplary composition preset-slug ring-array 70', in enlarged "exploded" view relation, as FIGURE 15. In the preferred tuner 15 construction each disc section 21, 22, 23 contains an identical basic molded disc 125. The disc 125 is shaped with peripheral cavities or recesses 126, 126 between contact spokes 127, 127.

Where individual coils are indicated in the circuit (see FIGURE 11), a wound spring-coil inductor is located in the appropriate recess, as shown in FIGURES 1 and 14. These coils 40, 102, 102' are all of predetermined inductance for their circuit function, but of the same outer diameter to fit into the coil recesses 126. They connect between perpendicularly extending solder tabs 131, (see FIGURES 13, 18 and 21), at the peripheral level, or tabs 132 at a radially interior level for the ring (70') side of oscillator section 23 (see FIGURE 14).

Figure 16:
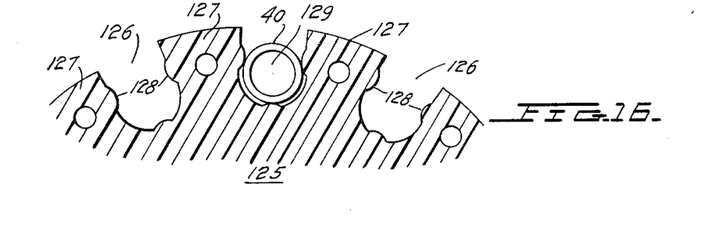
FIG. 16 is a partial cross-sectional view, greatly enlarged, of the coil recess section of the discs.

The disc coils are recessed below the contact periphery of the discs for mechanical protection. The extending tabs permit economical dip-soldering thereof. Two dip soldering steps, one at each face, provide the soldered connections for all the coils mounted on any disc 21, 22, 23. Three internal spaced ridges 128 are formed in each coil pocket or recess 126 proportioned to support the inserted coil, as 40, as shown in enlarged cross-sectional view, FIGURE 16. The spring wound coils 40, 102, 102' may be snapped into the pockets 126, and are firmly held by the ridges 128. Two radially outward ridges are located above the coil center 129, so that an interference fit prevails, and firm coil hold-in results. This facilitates mechanization in production. Further, the ridges 128 support the coils mainly spacedly from the disc material 125, and thereby minimize high frequency losses.

Figure 17:
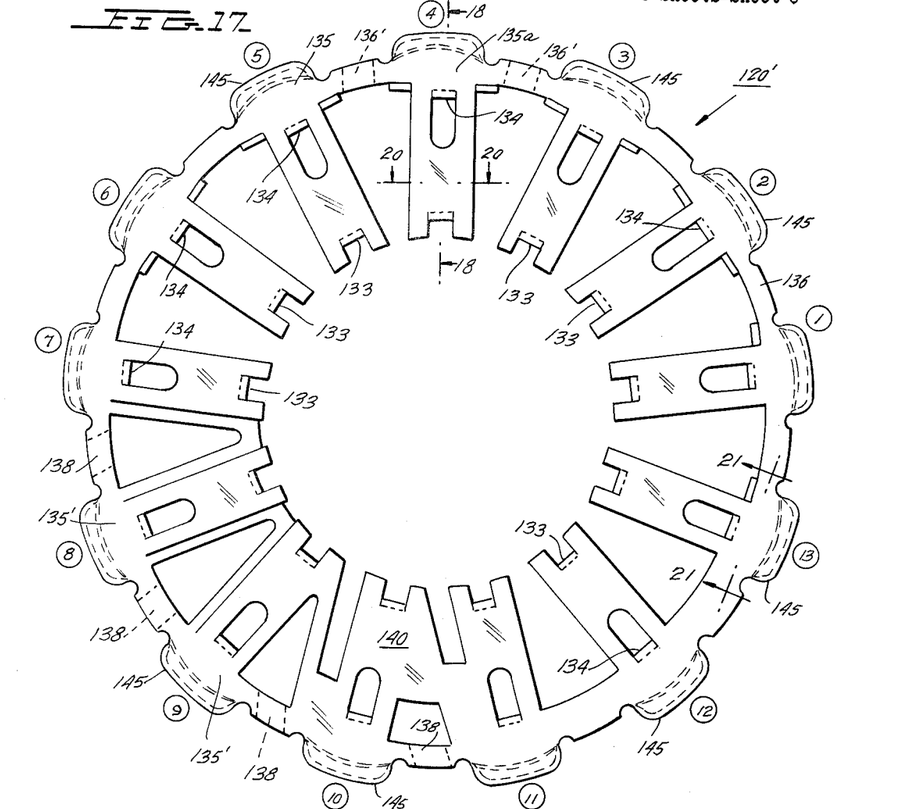
FIG. 17 is a plan view of a typical RF contact-inductor stamped plate for the tuner discs hereof.

The metal "plates," as 120, (FIGURE 13), are stamped from strip stock of suitable material. The separated contact portions, as 135, 135 are formed integrally with the plate 120, by bridge or tie bars 136, 136. As indicated in FIGURE 17, bridges 136', 136' at either side of typical separated contact 135a are severed along the dotted lines thereof at a suitable step in fabrication. The bridges 138, 138 of the incremental inductor portion 140 are arranged to provide the predetermined associated inductive steps when severed. All tie bars or bridges 136, 138 of one stamped plate 120' may be severed at the predetermined locations therefor, in one operation.

Figures 18, 19:
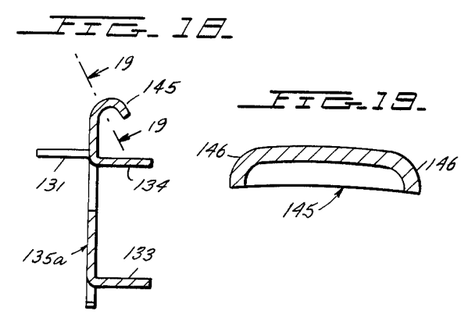
FIGS. 18 through 21 are cross-sectional views through corresponding portions of the plate of FIG. 17.
Figures 20, 21:
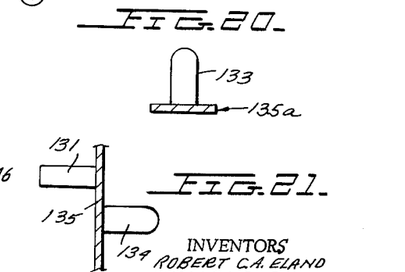

The stamped plate 120 is formed with anchor tabs or spades 133, 134 projecting perpendicularly out of each separated contactor 135, and of corresponding contactors 135' of the incremental inductor portion 140; see FIGURES 13, 18 and 20. These anchor tabs are positioned for securement coaction with corresponding pairs of apertures 143, 144 in the molded disc 125 at each contactor leg 127; see FIGURE 12. A plurality of such stamped plates 120 may be formed in a strip of stock, held together by peripheral holding tabs. These may then be simultaneously pressed together onto one face of individual molded discs 125 to reduce fabrication cost.

Each face "plate" 120 for each face of the respective disc assemblies 21, 22, 23 is designed to provide: the requisite inductance increments when part of the high channel 7 to 13 section 140 of the RF assemblies 21, 22; the separated contacts 135 for the low channels 2 to 6 and all the oscillator contacts; the coil solder tabs 131, 132; the anchor tabs 133, 134; and the radial arcuate contact surfaces 145 at the peripheral end of each effective contact portion 135, 135'.

The contact surfaces 145 are extended circumferentially to lengthen them and provide a make-before-break contact action with the fixed contactors of the tuner 15; the actual outer contacting surfaces 145 are smooth and cup-shaped for rigidity, as illustrated in FIGURES 18 and 19, with rounded lateral corners 146, 146 for minimum wear. An exemplary material for the stamped "plates" 120 is an alloy of nickel, zinc and copper similar to German silver; for use in conjunction with laminated silver stationary contactors. The bridge or tie bars 136, 138 are severed by a composite tool when the plates 120 and discs 125 are pressed together, leaving the individual contacts 135 and increment inductors 140 mechanically secure to form the unitary disc assemblies 21, 22, 23.

The molded discs 125 have integrally molded studs or keys 150, 150, as seen in FIGURE 12. Keys 150 project from the hub portion 155 of the discs 125, and are wedge-shaped. Keys 150, 150, of each disc coact and mesh with mating face slots 151, 151 in the facing hub 156 of the adjacent disc assembly, as seen in FIGURE 14. The exemplary keys 150 and slots 151 are paired per disc, and at off-180° positions. In the exemplary rotary assembly, as seen in FIGURE 1, the metal detent disc 24 is spot welded to the selector shaft. The hubs 155, 156 of the molded plastic discs 125 slip over the selector shaft 25 and have interlocking locating studs which orient them on the shaft 25 with respect to the detent disc 24. The detent disc 24 in turn is provided with punched-out holes (not shown) into which fit the locating keys or studs 150 of the adjacent discs 125. Each disc 125 has locating keys 150 which fit into corresponding face slots in adjacent disc 151 or detent plate.

The thus interlocked disc assemblies 21, 22, 23 are thereby correctly phased for selective channel tuning, and rigidly maintained as a unitary rotary assembly to prevent misphasing in use. The detent disc 24, centrally located and affixed to the selector shaft 25, serves as the basic anchor and reference for the disc assemblies 21, 22, 23. The result is a twelve-channel discrete inductance tuning drum (with the "1" position for UHF circuit conversion as aforesaid), fabricated with maximum flexibility of design function, and with a minimum of parts and production steps.

A very economical and rugged tuner results, with less than thirty percent of the drum components requisite in an equivalent turret tuner. The whole invention construction lends itself to a great deal of mechanization and reduction in handling and hand operations. As previously noted, the assembly process can be mechanized right to the punch press, where the contact "plates" 120 are made from a roll of strip stock, and these metal plates 120 may be assembled to the plastic discs 125 with the interconnecting bars 136, 138 removed before the plates 120 are separated from the strip stock. Also, the coil winding machine may be arranged to install the coils 102, 102' directly into the coil notches 126 in the molded discs 125 to eliminate handling and hand operations.

The entire assembly lends itself readily to considerable tuning circuit flexibility. For example, inasmuch as the upper TV band requires very little inductance changes from channel to channel, the shape into which the "plate" 120 is cut in the upper TV section 140 can be made quite precisely, and requires no factory adjustment in the RF tuner sections 21, 22. On the other hand, in the oscillator section, it is desirable to achieve adjustments, and to this end the oscillator "plate" is completely separated from channel to channel, for the insertion of the oscillator coils 40 which are adjusted for each channel, as set forth. In this manner, any channel may be designed to either be cut away, or have a coil inserted, as desired.

Although the present invention has been described in conjunction with an exemplary embodiment thereof, it is to be understood that variations and modifications therein may be made without departing from its broader spirit and scope as set forth in the following claims.

We claim:

1. In a television tuner, a rotary selective tuning assembly comprising a plurality of tuning inductor sections for the respective RF input, interstage-mixer and oscillator stages of the tuner circuit, each of said sections being constructed of a disc of dielectric material with two faces normal to the rotation axis of the tuner, a metallic array affixed to each of the disc faces and containing a contact arm at each channel tuning position of its associated disc and assembly, each of said contact arms extending radially beyond its disc peripheral surface and in angular phase relation to pair up with the corresponding contact arm at the opposite disc face, and a plurality of inductor coils arranged in transverse recesses in the peripheral region of said disc between successive contact arm pairs thereof for establishing inductor RF tuning steps for the VHF band.

2. In a VHF television tuner, a rotary selective tuning assembly comprising a plurality of tuning inductor sections for the respective RF input, interstage-mixer and oscillator stages of the tuner circuit, each of said sections being composed of a disc of dielectric material with two faces normal to the rotation axis of the assembly, a metallic array affixed to each of the disc faces, each of said arrays containing a contact arm at each channel tuning position of its associated disc and assembly, each of said contact arms having a contact portion extending radially beyond its disc peripheral region and in angular phase relation to pair up with the corresponding contact arm at the opposite disc face, the said contact portions subtending substantial angular segments of the disc periphery for extended contacting coaction with the stator contactor, a plurality of the contact arms of at least one of said arrays being interconnected to establish predetermined incremental inductor tuning steps for successive channels thereof in the upper frequency VHF band, and a plurality of inductor coils arranged in recesses in the peripheral region of said discs between successive contact arm pairs thereof for establishing the inductor RF tuning steps for the lower frequency VHF band and for the oscillator stage.

3. In a VHF television tuner, a rotary selective tuning assembly comprising a plurality of tuning inductor sections for the respective RF input, inter-stage mixer and oscillator stages of the tuner circuit, each of said sections being formed with a disc of dielectric material with two faces normal to the rotation axis of the assembly, a metallic array affixed to each of the disc faces, each of said arrays containing a contact arm at each channel tuning position of its associated disc and assembly, each of said contact arms having a contact portion extending radially beyond its disc peripheral region and in angular phase relation to pair up with the corresponding contact arm at the opposite disc face, the said extending contact portions subtending substantial angular segments of the disc periphery for extended contacting coaction with the stator contactors, the axial thickness of said disc predetermining the contact and contactor spacing along the tuner for each section, a plurality of the contact arms of both the RF input and interstage-mixer sections being serially interconnected to establish predetermined incremental inductor tuning steps for successive channels thereof in the upper frequency VHF band, and a plurality of inductor coils arranged in recesses in the peripheral region between successive contact arm pairs thereof for establishing the inductor RF tuning steps for the lower frequency VHF band and for the oscillator stage, solder lugs integral with the contractor arms pair associated with each of said coils and electrically connected therewith.

4. A television tuner as claimed in claim 1, further including a plurality of ridges spaced apart in said recesses for supporting the associated coil therein.

5. A television tuner as claimed in claim 2, further including a plurality of ridges spaced apart in each of the said recesses for supporting the associated coil therein apart from the basic recess surface.

6. A television tuner as claimed in claim 3 further including a plurality of ridges spaced apart in each of the said recesses for supporting the associated coil therein apart from the basic recess surface, two of the ridges for each coil being radially located above its axis.

7. A television tuner as claimed in claim 6 further including a central hub integrally extending axially of each disc with axially projecting key means for interlocking the disc along the tuning assembly in predetermined channel tuning phase relation with the other tuning sections.

8. A tuning inductor section for a television tuner comprising a disc of dielectric material with two faces normal to the rotation axis of the tuner, a metallic array affixed to each of the disc faces and containing a contact arm at each channel tuning position of the disc and assembly, each of said contact arms extending radially beyond its disc peripheral surface and in angular phase relation to pair up with the corresponding contact arm at the opposite disc face, and a plurality of inductor coils arranged in transverse recesses in the peripheral region of said disc between successive contact arm pairs thereof for establishing inductor RF tuning steps for the VHF band.

9. A tuning inductor section for a television tuner comprising a disc of dielectric material with two faces normal to the rotation axis of the tuner, a metallic array affixed to each of the disc faces, each of said arrays containing a contact arm at each channel tuning position of the disc and assembly, each of said contact arms having a contact portion extending radially beyond its disc peripheral region and in angular phase relation to pair up with the corresponding contact arm at the opposite disc face, the said contact portions subtending substantial angular segments of the disc periphery for extended contacting coaction with the stator contactors, the axial thickness of said disc predetermining the contact and contactor spacing along the tuner for each section, a plurality of the contact arms of at least one of said arrays being serially interconnected to establish predetermined incremental inductor tuning steps for successive channels thereof in the upper frequency VHF band, and a plurality of inductor coils arranged in transverse recesses in the peripheral region of said disc between successive contact arm pairs thereof for establishing the inductor RF tuning steps for the lower frequency VHF band and for the oscillator stage.

10. A television tuner as claimed in claim 8 further including a plurality of ridges spaced apart in said recesses for supporting the associated coil therein.

11. A television tuner as claimed in claim 9 further including a plurality of ridges spaced apart in each of the said recesses for supporting the associated coil therein apart from the basic recess surface, two of the ridges for each coil being radially located above its axis.

12. A television tuner as claimed in claim 2 further including a central hub integrally extending axially of each disc with axially projecting key means for interlocking the disc along the tuning assembly in predetermined channel tuning phase relation with the other tuning sections.

13. A television tuner as claimed in claim 8 further including a central hub integrally extending axially of said disc with projecting key means for interlocking the disc with an adjacent member of the tuner in predetermined channel tuning phase relation.

14. A television tuner as claimed in claim 9 further including a central hub integrally extending axially of said disc with projecting key means for interlocking the disc with an adjacent member of the tuner in predetermined channel tuning phase relation.

15. A television tuner as claimed in claim 1 in which each of said contact arms containing integral projecting tabs secured in corresponding apertures in the disc.

16. A television tuner as claimed in claim 3 in which each of the said contact arms containing integral laterally projecting anchor tabs secured in corresponding radially arrayed apertures in the disc.

References Cited by the Examiner

UNITED STATES PATENTS

| 2,802,946 | 8/1957 | Feigl | 334—49 |
| 2,954,469 | 9/1960 | Gelzer | 334—49 |

FOREIGN PATENTS

| 1,055,621 | 4/1959 | Germany. |

HERMAN KARL SAALBACH, *Primary Examiner.*